ns011066158B2

(12) United States Patent
Schmaling et al.

(10) Patent No.: US 11,066,158 B2
(45) Date of Patent: Jul. 20, 2021

(54) LOW DRAG HIGH CAPACITY PITCH BEARING FOR RIGID ROTOR AIRCRAFT

(71) Applicant: LOCKHEED MARTIN CORPORATION, Bethesda, MD (US)

(72) Inventors: David N. Schmaling, Southbury, CT (US); Andrew C. Goodwin, Shelton, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 111 days.

(21) Appl. No.: 16/433,338

(22) Filed: Jun. 6, 2019

(65) Prior Publication Data
US 2020/0385109 A1    Dec. 10, 2020

(51) Int. Cl.
| | | |
|---|---|---|
| *B64C 27/48* | (2006.01) | |
| *B64C 27/10* | (2006.01) | |
| *F16C 17/26* | (2006.01) | |
| *F16C 33/12* | (2006.01) | |

(52) U.S. Cl.
CPC ............. *B64C 27/48* (2013.01); *B64C 27/10* (2013.01); *F16C 17/26* (2013.01); *F16C 33/122* (2013.01); *F16C 2208/10* (2013.01); *F16C 2326/43* (2013.01)

(58) Field of Classification Search
CPC ........ F01D 5/30; F04D 17/127; F04D 19/024; F04D 29/05; F04D 29/056; F04D 29/34; B64C 27/48; B64C 27/10; B64C 11/06; B64C 11/30; B64C 27/35; B64C 27/78; B64C 27/80; F16C 17/26; F16C 33/122; F16C 2208/10; F16C 2326/43
See application file for complete search history.

(56) References Cited

U.S. PATENT DOCUMENTS

| | | | | |
|---|---|---|---|---|
| 3,942,910 A * | 3/1976 | Snyder | .................... | B64C 27/32 416/141 |
| 4,129,403 A * | 12/1978 | Watson | .................... | B64C 27/35 416/134 A |
| 5,110,259 A * | 5/1992 | Robinson | ................. | F16F 1/393 144/144.1 |
| 5,620,305 A * | 4/1997 | McArdle | .................. | B64C 27/45 416/134 A |
| 10,173,770 B2 * | 1/2019 | Nussenblatt | ............ | F16C 33/22 |
| 10,214,284 B2 * | 2/2019 | Hunter | .................... | B64C 27/35 |
| 10,301,012 B2 * | 5/2019 | Darrow, Jr. | ............. | B64C 27/32 |
| 10,696,386 B2 * | 6/2020 | Miner | ..................... | B64C 27/48 |
| 2020/0047880 A1 * | 2/2020 | Dunn | ...................... | B64C 27/48 |

* cited by examiner

*Primary Examiner* — Brian P Wolcott
(74) *Attorney, Agent, or Firm* — Foley & Lardner LLP (57) ABSTRACT

A pitch bearing assembly for a rotor blade and a hub assembly of a rotary wing aircraft includes a single inner race. An inboard outer race surrounds an inboard portion of the inner race and includes a first inboard blade connector and a second inboard blade connector that are configured to connect to the rotor blade. An inboard bearing is disposed between the inboard portion of the single inner race and the inboard outer race and includes an elastomer. An outboard outer race surrounds an outboard portion of the single inner race and includes a first outboard blade connector and a second outboard blade connector that are configured to connect to the rotor blade. An outboard bearing is disposed between the outboard portion of the inner race and the outboard outer race and includes an elastomer.

17 Claims, 9 Drawing Sheets

LOW DRAG HIGH CAPACITY PITCH BEARING FOR RIGID ROTOR AIRCRAFT

BACKGROUND

The embodiments disclosed herein relate to a pitch bearing for a rigid rotor of a rotary wing aircraft, and more particularly to a pitch bearing enabling low aerodynamic drag and withstanding high capacity loads.

The flight capabilities of rotary-wing aircrafts make them effective for a wide variety of missions due to their ability to take-off and land vertically in addition to their ability to hover. The rotating blades necessary for these abilities, however, require that their connections to a rotor shaft be able withstand high centripetal forces as the blades rotate as well as be able to change the pitch of the blades as they rotate. Existing connections that can withstand the centripetal forces use a bearing that presents a larger than desired cross-sectional area that is susceptible to drag, thereby decreasing the efficiency of the rotary wing aircraft in flight.

BRIEF DESCRIPTION

Disclosed is a pitch bearing assembly for a rotor blade and a hub assembly of a rotary wing aircraft. The pitch bearing assembly includes: a single inner race; an inboard outer race surrounding an inboard portion of the inner race and having a first inboard blade connector and a second inboard blade connector that are configured to connect to the rotor blade; an inboard bearing disposed between the inboard portion of the single inner race and the inboard outer race and having an elastomer; an outboard outer race surrounding an outboard portion of the single inner race and having a first outboard blade connector and a second outboard blade connector that are configured to connect to the rotor blade; and an outboard bearing disposed between the outboard portion of the inner race and the outboard outer race and having an elastomer.

Also disclosed is a rotary wing aircraft. The rotary wing aircraft includes an airframe, a rigid rotor system coupled to the airframe and having a hub assembly connected to a rotor blade configured to rotate to lift the aircraft; and a pitch bearing assembly. The pitch bearing assembly includes: (i) a single inner race; (ii) an inboard outer race surrounding an inboard portion of the single inner race and having a first inboard blade connector and a second inboard blade connector that are connected to the rotor blade; (iii) an inboard bearing disposed between the inboard portion of the single inner race and the inboard outer race and having an elastomer; (iv) an outboard outer race surrounding an outboard portion of the single inner race and having a first outboard blade connector and a second outboard blade connector that are connected to the rotor blade, wherein a cross-sectional area of the rotor blade at the first and second outboard blade connectors is less than a cross-sectional area of the rotor blade at the first and second inboard blade connectors; and (v) an outboard bearing disposed between the outboard portion of the single inner race and the outboard outer race and comprising an elastomer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
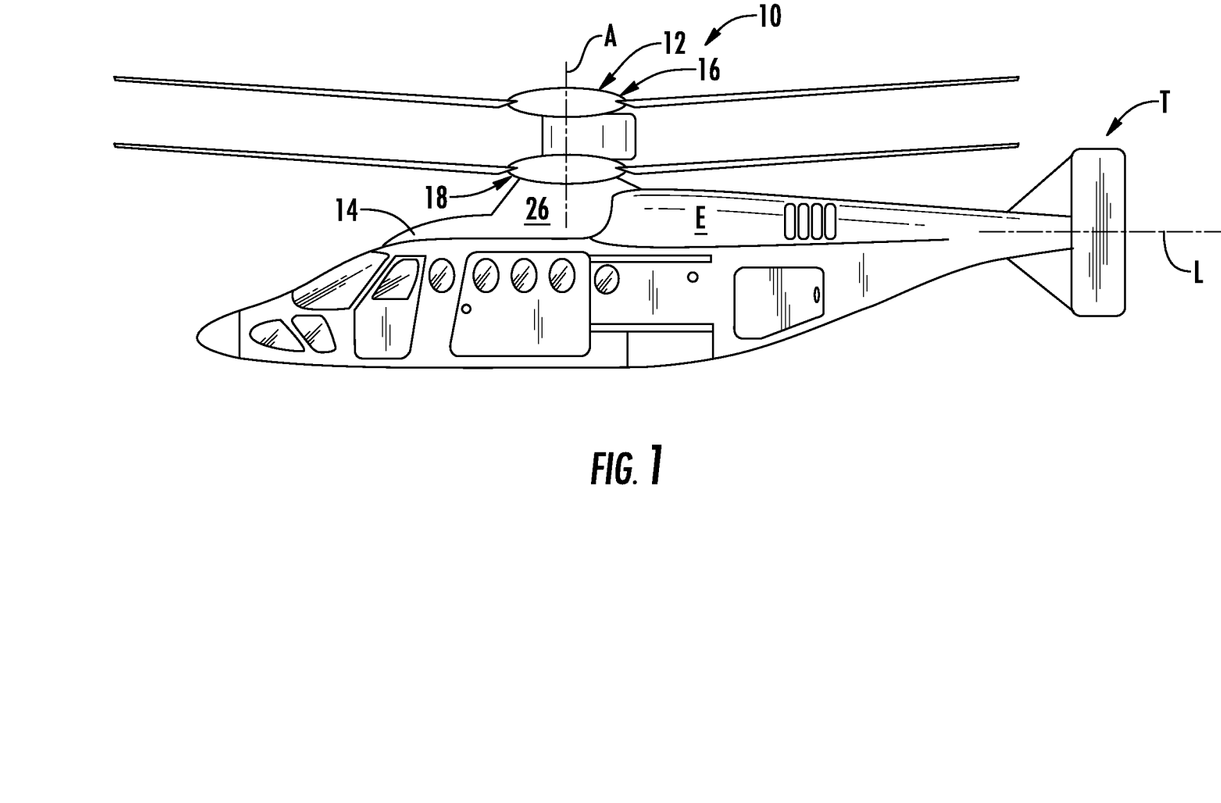
FIG. 1 is a perspective view of a rotary wing aircraft having a rigid rotor system.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems, and any single main rotor aircraft will also benefit from the present invention. In one or more embodiments, the coaxial rotor system 12 is a rigid rotor system in which mechanical components enable each rotor blade of the rotor system to change pitch as the blades rotate. The rigid rotor system in general does not include mechanical components for enabling flap movement and lead/lag movement of the blades. Any flap movement or lead/lag movement is due to bending of the blades.

A main gearbox 26, which may be located above the aircraft cabin, drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T. While shown with one or more gas turbine engines, it is understood that other types of engines can be used, such as piston engines, electric engines, or hybrid engines which use electrical and non-electrical power sources.

Figure 2:
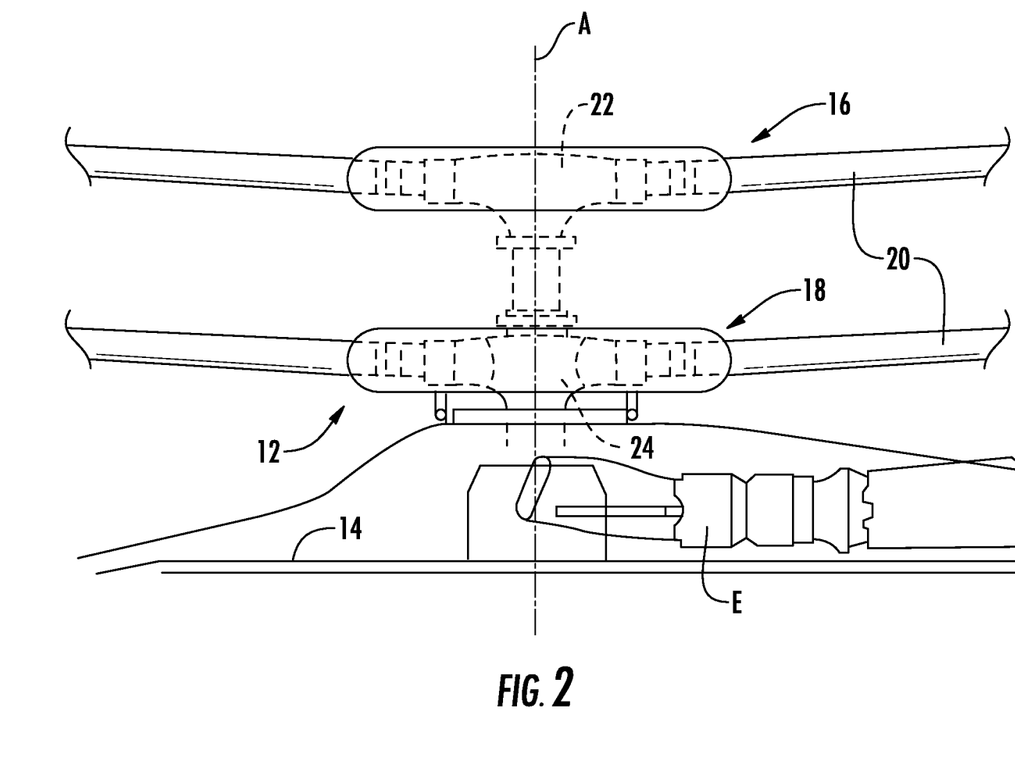
FIG. 2 is a detailed view of the rigid rotor system having a rotor hub assembly.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the main rotor blade assemblies 20 project radially outward from the hub assemblies 22, 24. Any number of main rotor blade assemblies 20 may be used with the rotor system 12.

Figure 3:
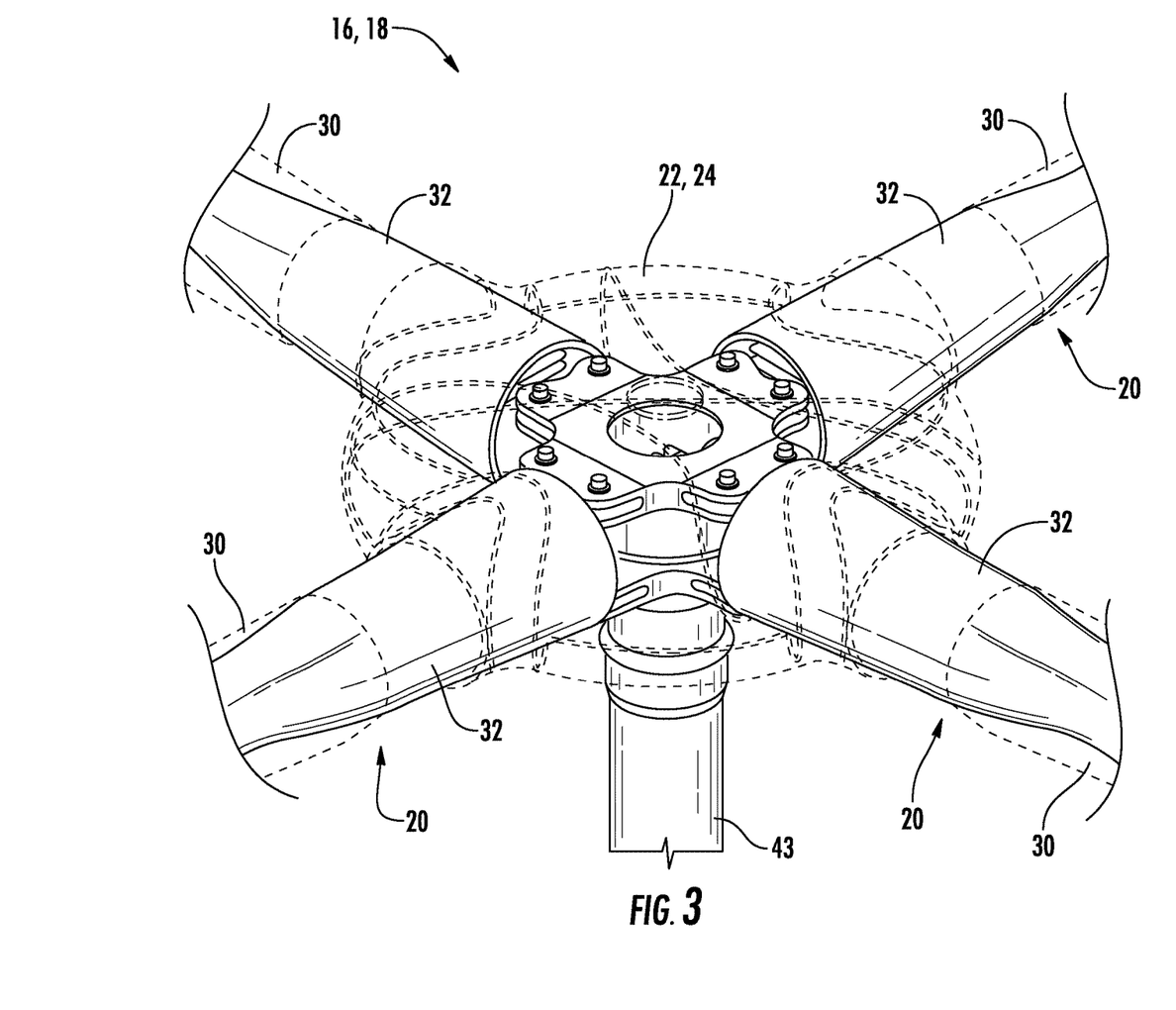
FIG. 3 is a perspective view of a portion of the rigid rotor system in an in-flight position according to an embodiment.

Referring now to FIG. 3, at least one of the rotor blade assemblies 20 of the rotor system 12 includes a rotor blade 30, a rotor blade torque tube 32, and a rotor shaft 43, which rotates to rotate the rotor hub assembly 22 or 24 in turn. In the illustrated, non-limiting embodiment, the main rotor system 12 is a rigid rotor system.

Figure 4:
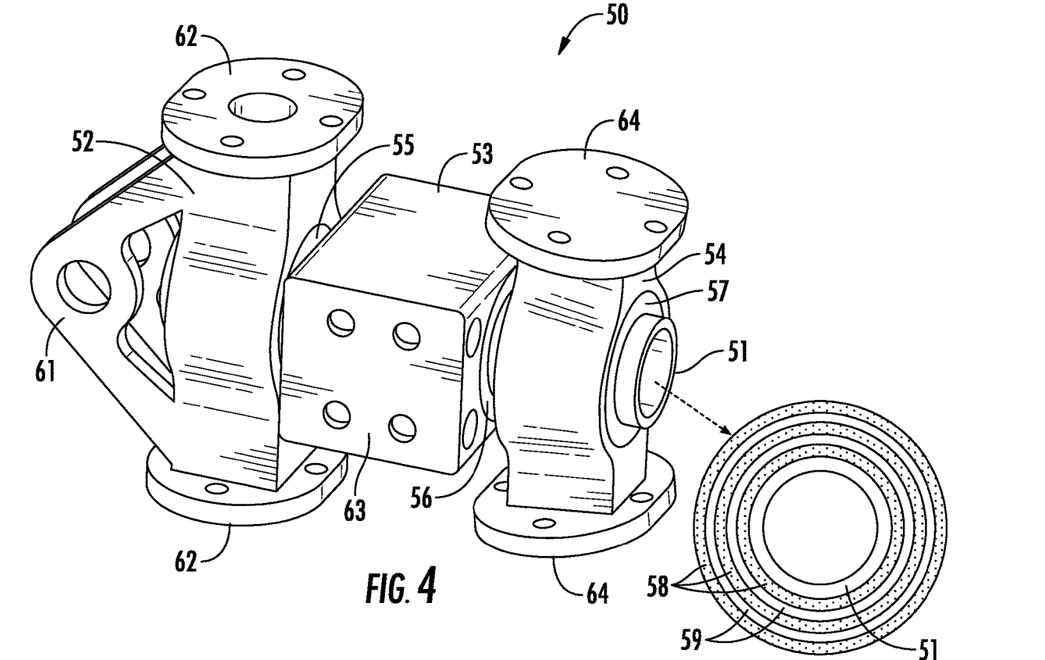
FIG. 4 is a perspective view of a pitch bearing assembly.

FIG. 4 depicts aspects of a pitch bearing assembly 50. The pitch bearing assembly includes a single inner race 51 that is common to three individual outer races. In one or more embodiments, the single inner race 51 is made of a metallic material such as titanium or stainless steel. The outer races include an inboard outer race 52, a middle outer race 53, and an outboard outer race 54. The term "inboard" relates to being closest to the rotor hub assembly 22 or 24, while the term "outboard" relates to being furthest away from the rotor hub assembly 22 or 24 with the term "middle" relating to being between inboard and outboard. In one or more embodiments, the outer races 52, 53 and 54 are made of a metallic material such as titanium or stainless steel. The pitch bearing assembly 50 further includes an inboard bearing 55 comprising an elastomeric material, a middle bearing 56 comprising an elastomeric material, and an outboard bearing 57 comprising an elastomeric material.

The inboard bearing 55 is disposed between the single inner race 51 and the inboard outer race 52. The middle bearing 56 is disposed between the single inner race 51 and the middle outer race 53. The outboard bearing 57 is disposed between the single inner race 51 and the outboard outer race 54. In one or more embodiments, each of the bearings 55, 56 and 57 may comprise a series of alternating layers of an elastomeric material 58 and a metallic material 59 as illustrated in a side view in a lower right side of FIG. 4. The series of alternating layers results in bearing loads being distributed among the layers of the elastomeric material.

Figure 5:
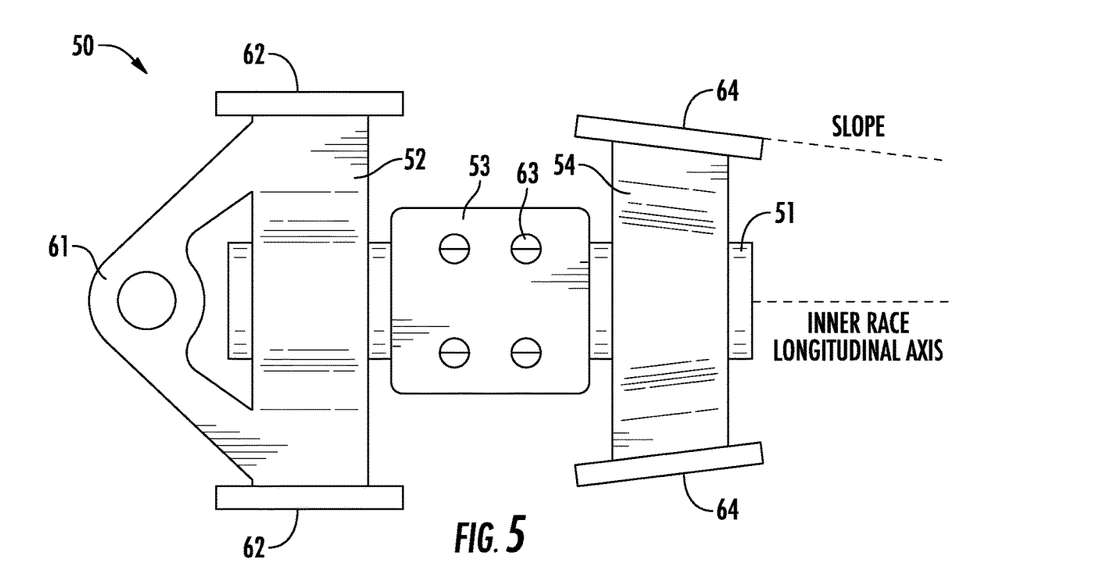
FIG. 5 is a side view of the pitch bearing assembly.

The inboard outer race 52 includes inboard blade connectors 62, which may define bolt holes for a bolting arrangement, configured to connect the inboard outer race 52 to one blade 30. The inboard outer race 52 may also include a tension torsion strap connector 61 configured to connect the inboard outer race 52 to a tension torsion strap (discussed further below). The middle outer race 53 includes a hub extender connector 63, which may define bolt holes for a bolting arrangement, configured to connect the middle outer race 53 to a hub extender (discussed further below). The middle outer race 53 may be hollow to reduce material and therefore weight of the middle outer race 53. The outboard outer race 54 includes outboard blade connectors 64, which may define bolt holes for a bolting arrangement, configured to connect the outboard outer race 54 to the same blade 30 that is connected to the inboard outer race 52. In one or more embodiments as illustrated in FIG. 5, the distance between the outboard blade connectors 64 can be less than the distance between the inboard connectors 62. In addition, the outboard blade connectors 64 can be sloped. Because that distance can be less and the connectors 64 can be sloped, the cross-sectional area of the blade 30 at the outboard connectors 64 can be less than the cross-sectional area of the blade 30 at the inboard blade connectors 62 resulting in less aerodynamic drag and an increase in efficiency.

Figure 6:
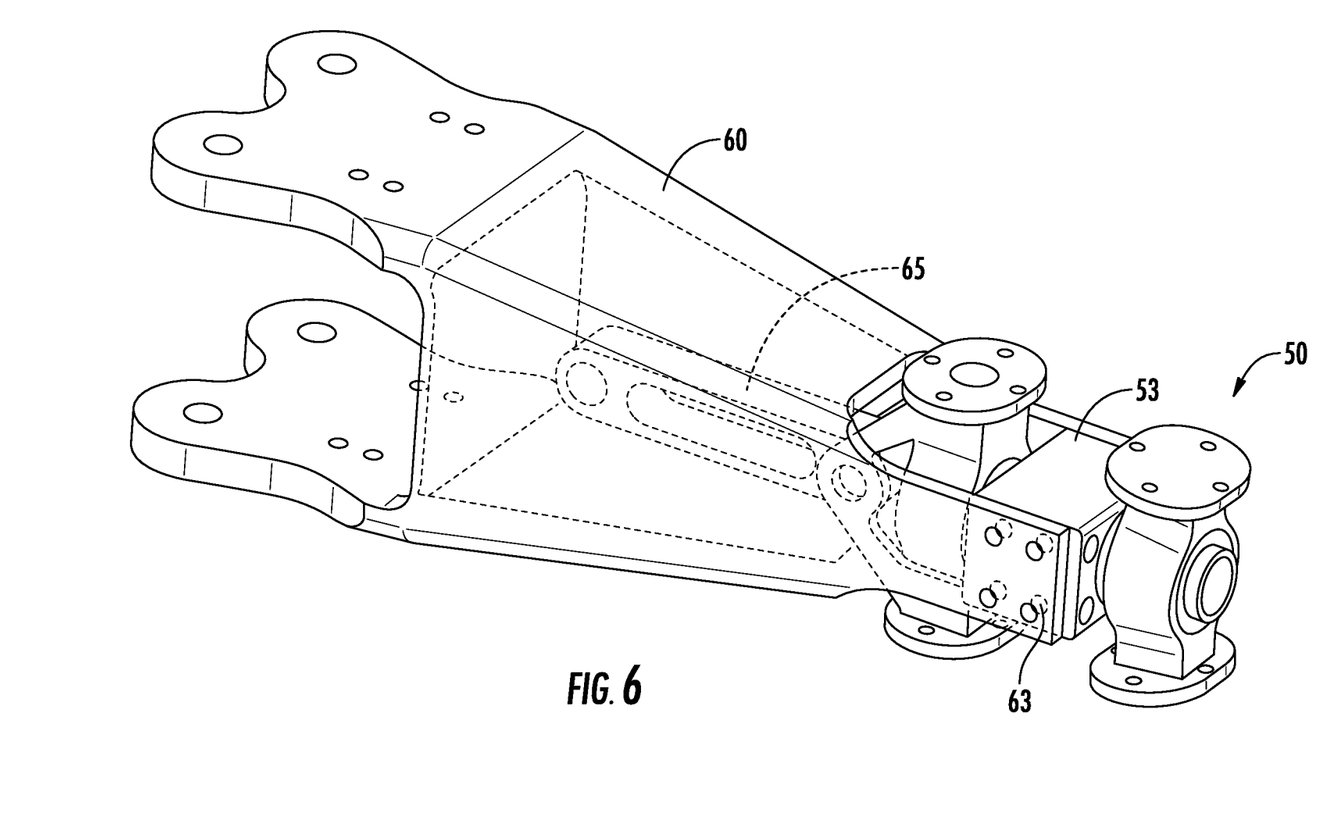
FIG. 6 is a perspective view of a pitch bearing assembly coupled to a hub extender.
Figure 7:
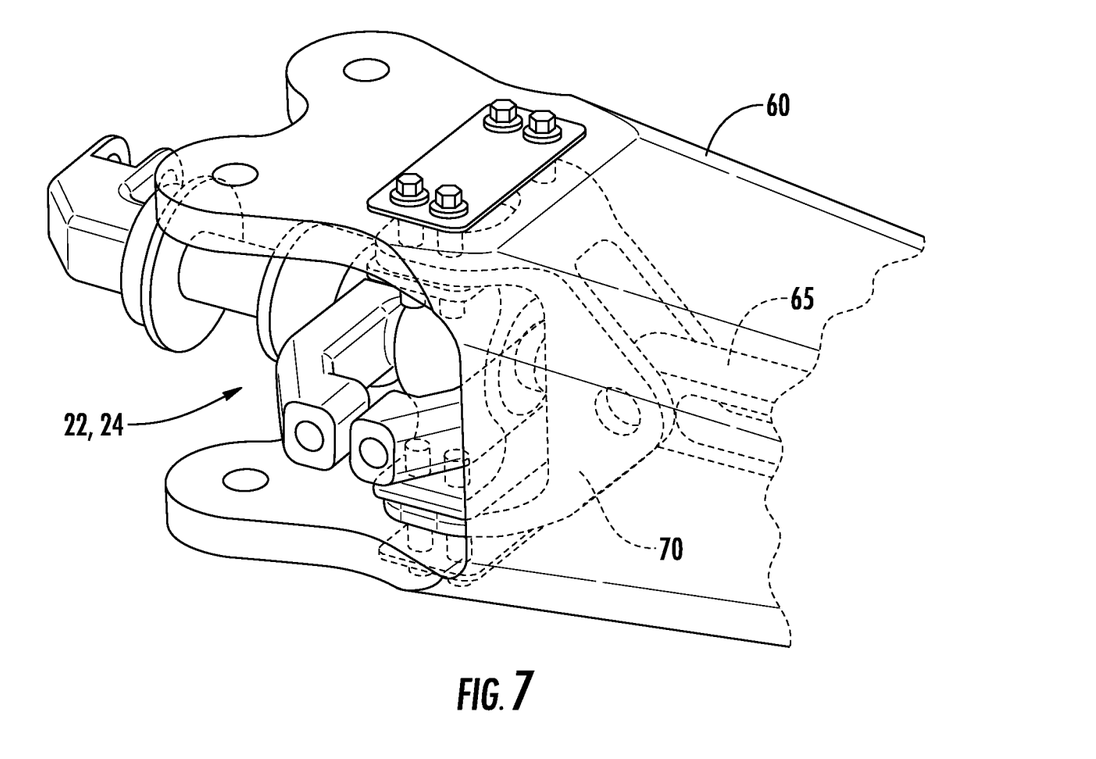
FIG. 7 is a perspective view of a tension torsion strap connected to the rotor hub assembly.

FIG. 6 depicts aspects of the pitch bearing assembly 50 being connected to a hub extender 60, which in turn is connected to the rotor hub assembly. As illustrated in FIG. 6, the hub extender 60 is connected to the middle outer race 53 using the hub extender connector 63 (e.g., bolting arrangement). FIG. 6 also illustrates a tension torsion strap 65 connected to the tension torsion strap connector 61 of the inboard outer race 52. An inboard part of the tension torsion strap 65 is connected to a stationary anchor 70 assembled to the hub extender 60 as illustrated in FIG. 7. The tension torsion strap 65 is configured to apply a tension force to the blade 30 via the pitch bearing assembly 50 as the blade 30 rotates and also allow the blade 30 to change pitch as it rotates. The tension torsion strap 65 can have an elongated body with curved opposing ends and may be formed of any suitable material such as steel or Kevlar for example. The elongated body may include an opening at the center of the body to reduce material and therefore weight of the tension torsion strap 65.

Figure 8:
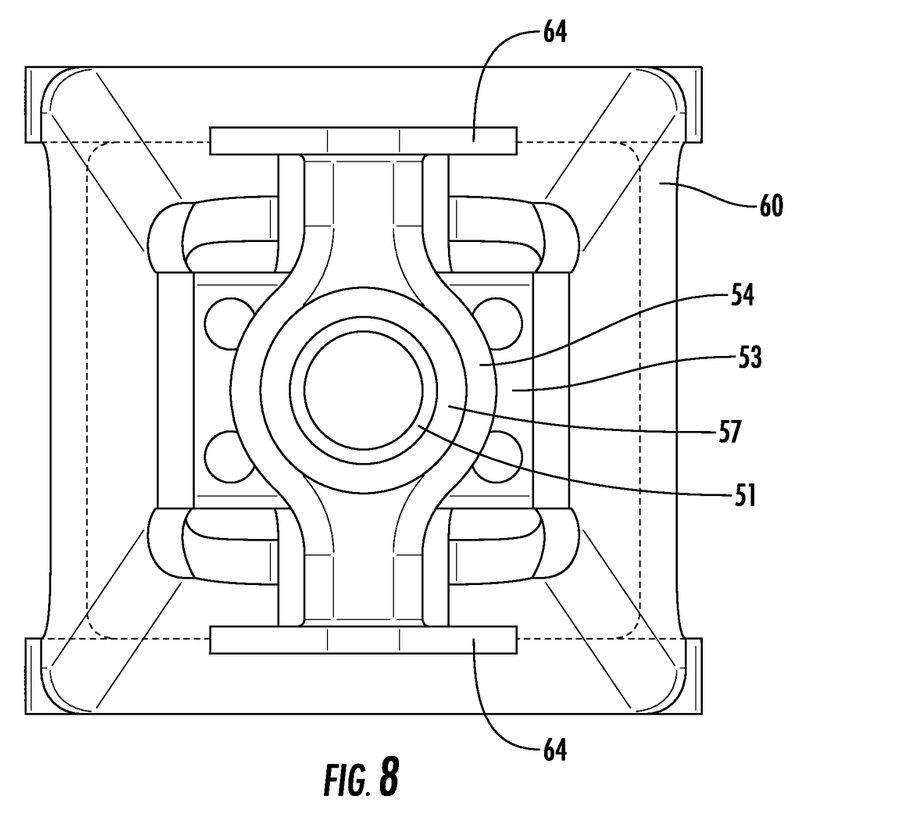
FIG. 8 is an end view of the bearing assembly looking inward towards the rotor hub assembly with an outboard outer race in a vertical alignment.
Figure 9:
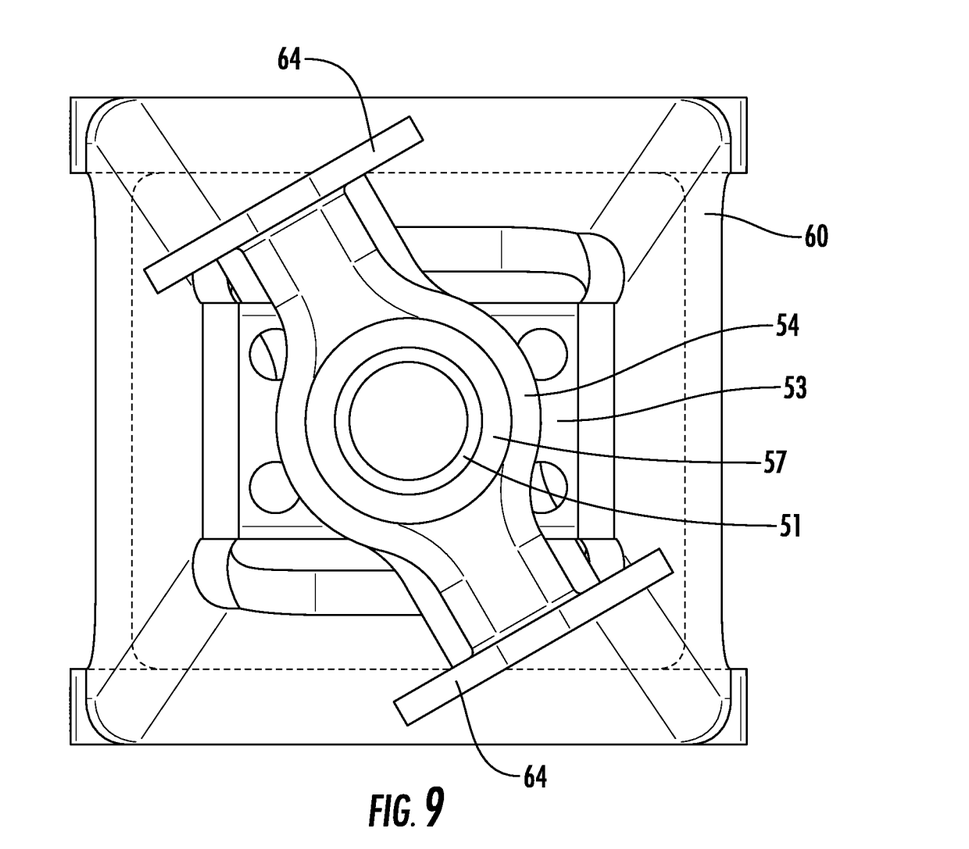
FIG. 9 is an end view of the bearing assembly looking inward towards the rotor hub assembly with the outboard outer race pitched 30 degrees.
Figure 10:
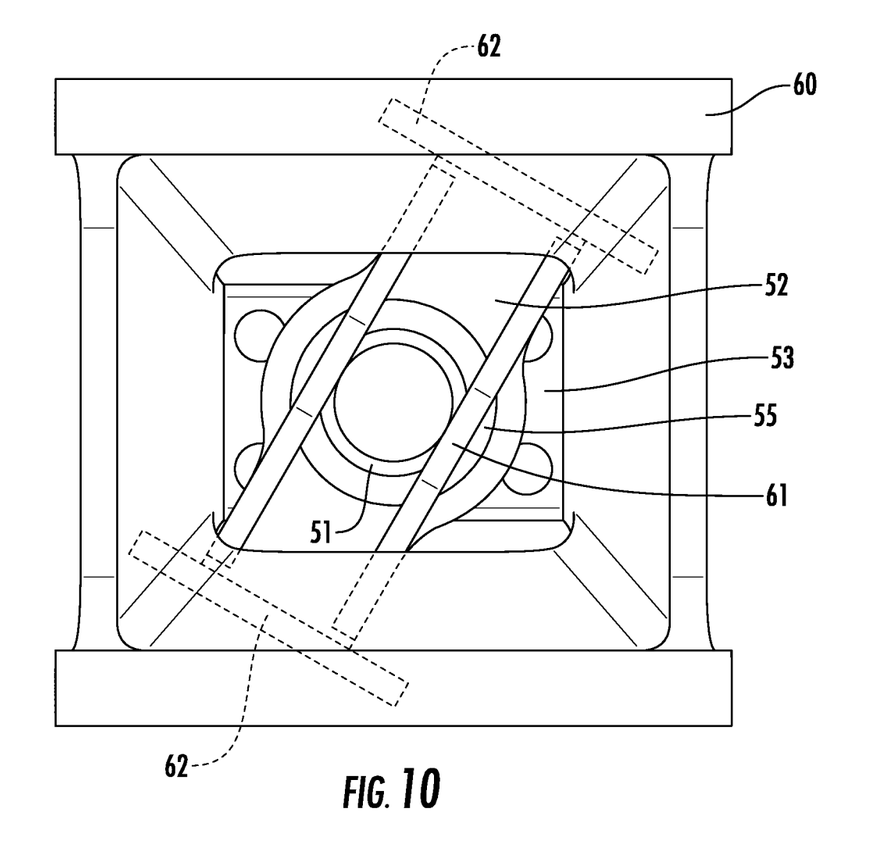
FIG. 10 is an end view of the bearing assembly looking outward from the rotor hub assembly with an inboard outer race pitched 30 degrees.

FIG. 8 illustrates an outboard end view of the pitch bearing assembly 50 connected to the hub extender 60 with the outboard blade connectors 64 aligned vertically. FIG. 9 illustrates an outboard end view of the pitch bearing assembly 50 connected to the hub extender 60 with the outboard blade connectors 64 pitched at an approximately 30-degree angle to the vertical alignment. FIG. 10 illustrates an inboard view of the pitch bearing assembly 50 connected to the hub extender 60 with the inboard blade connectors 62 pitched at the approximately 30-degree angle to the vertical alignment.

Elements of the embodiments have been introduced with either the articles "a" or "an." The articles are intended to mean that there are one or more of the eta s. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a specific order but are intended to distinguish elements.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pitch bearing assembly for a rotor blade and a hub assembly for a rotary wing aircraft, the pitch bearing assembly comprising:
   a single inner race;
   an inboard outer race surrounding an inboard portion of the inner race and comprising a first inboard blade connector and a second inboard blade connector that are configured to connect to the rotor blade;
   an inboard bearing disposed between the inboard portion of the single inner race and the inboard outer race and comprising an elastomer;
   an outboard outer race surrounding an outboard portion of the single inner race and comprising a first outboard blade connector and a second outboard blade connector that are configured to connect to the rotor blade; and an outboard bearing disposed between the outboard portion of the inner race and the outboard outer race and comprising an elastomer,
wherein the first and second outboard blade connectors are slanted with respect to a longitudinal axis of the single inner race.

2. The pitch bearing assembly according to claim 1, further comprising a middle outer race surrounding a middle portion of the inner race and disposed between the inboard and outboard outer races, the middle outer race comprising a connector configured to connect to the hub assembly, and a middle bearing disposed between the middle portion of the inner race and the middle outer race and comprising an elastomer.

3. The pitch bearing assembly according to claim 2, wherein the connector of the middle outer race is configured to connect to a hub extender for connecting to the hub assembly.

4. The pitch bearing assembly according to claim 3, wherein the connector of the middle outer race comprises a bolting arrangement.

5. The pitch bearing assembly according to claim 2, wherein at least one of the inboard bearing, the middle bearing, and the outer bearing comprises a concentric alternating series of layers of an elastomer material and a metallic material.

6. The pitch bearing assembly according to claim 1, wherein the first and second inboard blade connectors comprise a bolting arrangement.

7. The pitch bearing assembly according to claim 1, wherein the first and second outboard blade connectors comprise a bolting arrangement.

8. The pitch bearing assembly according to claim 1, wherein the inboard outer race comprises a tension torsion strap connector configured to connect to a tension torsion strap.

9. The pitch bearing assembly according to claim 1, wherein the rotary wing aircraft comprises a rigid rotor.

10. A rotary wing aircraft comprising:
an airframe;
a rigid rotor system coupled to the airframe and comprising a hub assembly connected to a rotor blade configured to rotate to lift the aircraft;
a pitch bearing assembly comprising: (i) a single inner race; (ii) an inboard outer race surrounding an inboard portion of the single inner race and comprising a first inboard blade connector and a second inboard blade connector that are connected to the rotor blade; (iii) an inboard bearing disposed between the inboard portion of the single inner race and the inboard outer race and comprising an elastomer; (iv) an outboard outer race surrounding an outboard portion of the single inner race and comprising a first outboard blade connector and a second outboard blade connector that are connected to the rotor blade, wherein a cross-sectional area of the rotor blade at the first and second outboard blade connectors is less than a cross-sectional area of the rotor blade at the first and second inboard blade connectors; and (v) an outboard bearing disposed between the outboard portion of the single inner race and the outboard outer race and comprising an elastomer; and
a tension torsion strap connected to the pitch bearing assembly.

11. The rotary wing aircraft according to claim 10, wherein the pitch bearing assembly further comprises a middle outer race surrounding a middle portion of the single inner race, the middle outer race comprising a connector configured to connect to the hub assembly, and a middle bearing disposed between the middle portion of the single inner race and the middle outer race and comprising an elastomer.

12. The rotary wing aircraft according to claim 11, further comprising a hub extender for connecting to the hub assembly, wherein the connector of the middle outer race is connected to the hub extender.

13. The rotary wing aircraft according to claim 10, wherein a distance between the first and second outboard blade connectors is less than a distance between the first and second inboard blade connectors.

14. The rotary wing aircraft according to claim 13, wherein the first and second outboard blade connectors are slanted with respect to a longitudinal axis of the single inner race.

15. The rotary wing aircraft according to claim 10, wherein the tension torsion strap is further connected to the hub assembly.

16. The rotary wing aircraft according to claim 15, wherein the tension torsion strap is connected to a hub extender connected the hub assembly.

17. A pitch bearing assembly for a rotor blade and a hub assembly for a rotary wing aircraft, the pitch bearing assembly comprising:
a single inner race;
an inboard outer race surrounding an inboard portion of the inner race and comprising a first inboard blade connector and a second inboard blade connector that are configured to connect to the rotor blade;
an inboard bearing disposed between the inboard portion of the single inner race and the inboard outer race and comprising an elastomer;
an outboard outer race surrounding an outboard portion of the single inner race and comprising a first outboard blade connector and a second outboard blade connector that are configured to connect to the rotor blade; and
an outboard bearing disposed between the outboard portion of the inner race and the outboard outer race and comprising an elastomer,
wherein a distance between the first and second outboard blade connectors is less than a distance between the first and second inboard blade connectors.

* * * * *